F. POOLE.
LIQUID HEATER.
APPLICATION FILED FEB. 9, 1915.

1,210,691.　　　　　　　　　　Patented Jan. 2, 1917.

Witnesses　　　　　　　　　　Inventor
　　　　　　　　　　　　　　　Fred Poole,
　　　　　　　　　　　　By
　　　　　　　　　　　　　　　Attorney

UNITED STATES PATENT OFFICE.

FRED POOLE, OF JEWELL CITY, KANSAS.

LIQUID-HEATER.

1,210,691.　　　　Specification of Letters Patent.　　Patented Jan. 2, 1917.

Application filed February 9, 1915. Serial No. 7,171.

*To all whom it may concern:*

Be it known that I, FRED POOLE, a citizen of the United States, residing at Jewell city, in the county of Jewell and State of Kansas, have invented certain new and useful Improvements in Liquid-Heaters, of which the following is a specification.

This invention relates to liquid heaters, and more particularly to that class of liquid heaters commonly termed "instantaneous", and the primary object of my invention is to provide an improved form of liquid heater for use in a water conduit, an electric heating element or elements being provided whereby to heat the liquid flowing through the conduit.

Another object of my invention is to so support the heating elements that a maximum heating surface will be afforded for contact with the liquid.

A still further object of my invention is to provide a suitable casing for supporting the heating elements, this casing being interposed in a liquid conduit, and being provided with water-tight connections.

A still further object is to provide suitable means for supporting the various heating elements in spaced relation within the casing so as to insure a contact heating surface of the broadest possible area and not interfere to any appreciable extent with the flow of liquid therethrough.

A still further object of my invention is to provide peculiarly formed electric heating elements for use in this form of my invention, any suitable means being provided to afford detachable connection therewith of a source of electric energy.

With the above and other objects in view, my invention resides preferably in the construction, combination, and arrangement of parts as hereinafter set forth in the specification and illustrated in the accompanying drawings, in which—

Figure 1:
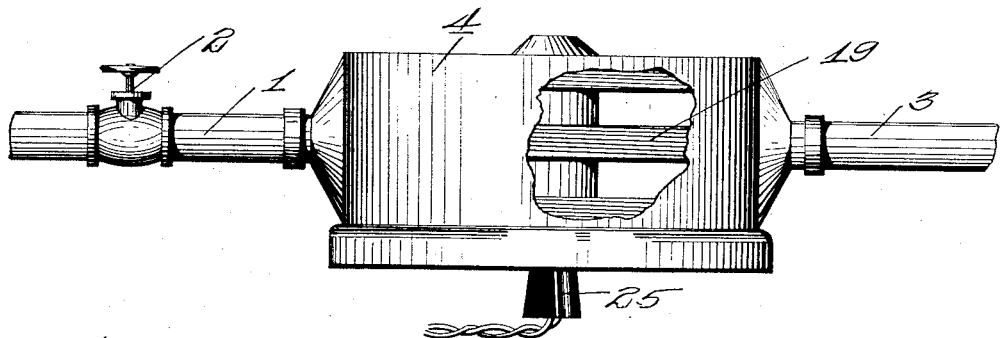
Figure 2:
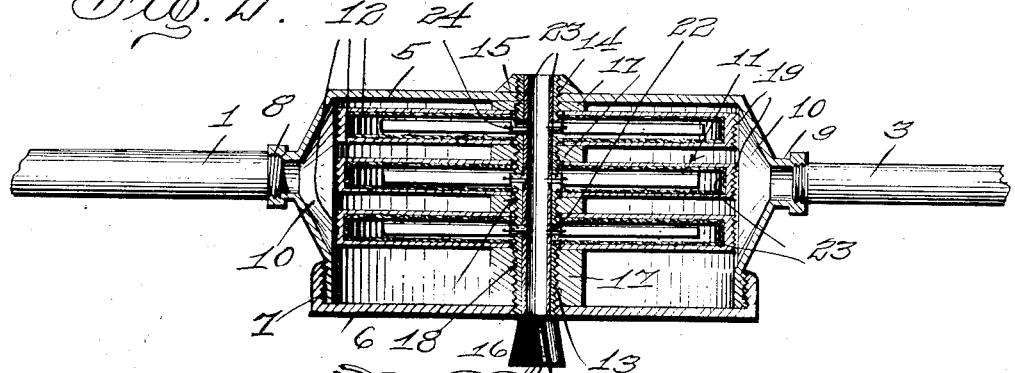
Figure 3:
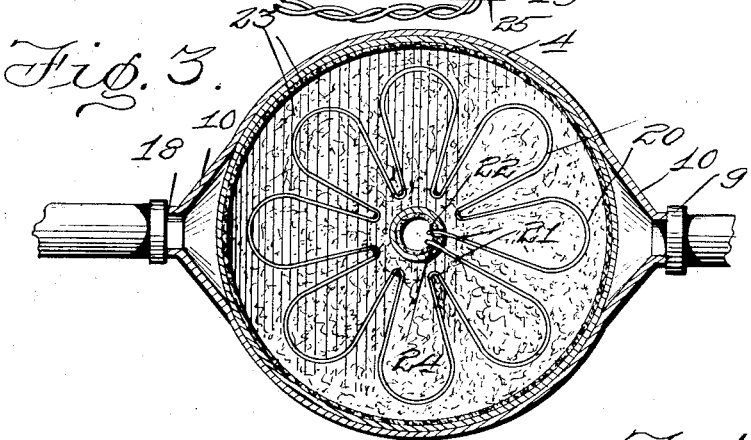

Figure 1 is a side elevation of my improved liquid heater, a portion of the same being broken away to illustrate partially the interior arrangement. Fig. 2 is a vertical sectional view taken through Fig. 1, and Fig. 3 is a transverse sectional view of the same.

Similar reference characters indicate similar parts throughout the various views of the drawings.

Referring more particularly to the drawings in which the preferred embodiment of my invention is illustrated, the numeral 1 indicates a portion of a water conduit or the like having a controlling valve 2 therein to stop communication through the conduit. A continuation of the conduit 1 is indicated at 3.

I provide a casing 4 which is substantially cylindrical as shown, said casing 4 having one end thereof closed by a wall 5 and the opposite end thereof closed by means of a cap 6 which is in threaded engagement as shown at 7 with the peripheral wall of the cylindrical casing 4. Inlet and outlet openings 8 and 9 respectively, are provided at diametrically opposite points on the peripheral wall of the casing 4, the said wall being tapered as indicated at 10 adjacent both openings so as to facilitate ingress and egress of the liquid thereto and therefrom. The conduits 1 and 3 may be threaded or otherwise secured in the openings 8 and 9. The inner surface of the peripheral wall 4 is threaded as shown at 11 for a purpose which will hereinafter become apparent.

I provide a plurality of heating disks indicated at 12. Any number of these heating disks may be applied, but I have only shown three to illustrate the preferred embodiment of my invention. In order to support the heating disks concentrically within the casing 4 I provide a staff comprising a tubular member 13 threaded externally throughout its length, the said threaded tubular member being in threaded engagement with the wall 5 of the casing 4 through the medium of a threaded opening 14 provided in an enlarged portion 15, the opposite end of said threaded tubular member 13 being in threaded engagement with the cap 6 through the medium of an opening 16. The heating disks 12 are provided with central openings affording communication with interior thereof, the said disks being mounted on the tubular member 13 in spaced relation to each other by means of spacing nuts 17, one of these nuts being interposed between the heating disks and in threaded engagement with the tubular member 13 as indicated at 18. In order to assist the tubular member 13 in performing its function, the outer periphery of each of the disks 12 is threaded as indicated at 19 for engagement with the threads 11 on the interior of the peripheral wall of the casing 4. It will thus be seen that the heating disks 12 are supported in a very rigid manner which insures their retention in proper position, and also prevents distortion thereof laterally which would allow ingress of liquid to the interior of the disks and interfere with the operation of the device.

It is preferred when assembling the device that any material which is suitable to render pipe joints water tight may be utilized for rendering the joints between the disks and the tubular member 13 water tight, it being found that white lead is a very useful expedient for attaining this object.

The heat generating element which I desire to provide in this instance preferably comprises flat strips of metal of any suitable material for the purpose, the said strips being looped within the disks radiating from the central axis of the said disks, the said loop portions being indicated at 20, the said heat generating elements being connected in series or separately as desired, whereby different degrees of heat may be obtained. This feature has not been shown in the drawings and does not enter into the present invention.

The terminals of each unit of the heat generating elements are indicated at 21, openings 22 being provided in the tubular member 13 coincident with the hollow disks 12 to allow passage therethrough of the terminals of said heating units for connection to a source of electrical energy as desired. The inner surfaces of the tubular member 13 and the heating disks 12 are each lined with some insulating material 23 which is fire proof, the heat generating units being of a thickness which will completely fill the space within the hollow disks so as to provide as large a heat generating area as possible and bring the respective surfaces of the heat generating elements as close to the wall of the disks 12 as is practicable, thereby greatly enhancing the efficiency of the device. Suitable bushings 24 are provided in the openings 22 to receive the terminals 21 of each of the heating units. The formation of each of the heating units is very advantageous as it serves to distribute the heat and cause a uniform radiation which not only increases the efficiency of the device but prevents overheating of relative stretches of the heating units which would have a tendency to fuse the same and cause destruction of the insulation or similar other trouble.

From the above description taken in connection with the accompanying drawings, it is thought that a clear and comprehensive understanding of my invention may be had, and it will be noted that, when the device is in use, the same is interposed in a pipe line, the liquid passing through the conduit 1 and entering the inlet 8, whereupon it will be circulated around and between the various heating disks, becoming heated to any desired degree, and making egress through the exit 9 to a continuation of the conduit 1 indicated at 3 to the point at which it is to be used.

The structure illustrated will be found to be a very advantageous one, repairing of the parts being rendered rather convenient owing to the peculiar construction, it being noted that to repair the device it is only necessary to remove the cap 6 which allows of access to the various heating disks, removal of the disks being facilitated by means of the ready removal of the spacing nuts 17. The spacing nuts 17 may be of any desired shape, but have been shown round in the drawings, the well known Stillson wrench being applicable for use in loosening the nuts. I have found it very expedient in this case to provide the nuts 17 with knurled surfaces so as to facilitate removal of the same.

While I have shown and described my invention as possessing a peculiar form and construction, it is desired that it be understood that I may make such changes in the details thereof that do not depart from the spirit and scope of the invention as claimed.

Having thus described my invention what I claim and desire to secure by Letters Patent is:

1. A liquid heater, including a casing interposed in a fluid conduit, disk like heating elements detachably mounted in said casing, said heating elements being in spaced relation with their respective axes in alinement and at right angles to the flow of liquid through said casing to present relatively large heating surfaces, and an electric heating unit carried within each of said heating elements.

2. A liquid heater, including a casing interposed in a fluid conduit and having an open face, a cover for said open face, a plurality of heat chambers mounted in spaced relation in said casing and in the path of flow of liquid therethrough, the axes of said heat chambers being concentric and substantially at right angles to the flow of liquid therethrough, and an electric heating unit snugly receivable in each of said heat chambers and being detachably connected to a source of electric energy.

3. A liquid heater, including a casing having an open face, a cover for said open face, said casing being interposed in a fluid conduit, a plurality of heat chambers containing electric heating units therein, means for supporting said heat chambers in said casing, and means for maintaining said heat chambers in spaced relation carried by said supporting means, each of said heat chambers being independently movable as desired on said supporting means, and being independently or collectively controllable.

4. A liquid heater including a casing of substantially cylindrical configuration having inlet and outlet openings in the peripheral wall thereof, heat chambers receivable within said casing and in threaded engagement with the peripheral wall thereof, supporting means carried by the end walls of said casing and passing axially through and supporting said heat chambers, spacing members carried by said supporting means, and an electric heating unit receivable in each of said heat chambers and in substantially snug engagement with the respective walls thereof.

5. A liquid heater, including a casing interposed in a fluid conduit, a plurality of disk like heat unit receptacles concentrically mounted in spaced relation in said casing, said receptacles being peripherally and axially supported, and disposed with the respective faces thereof parallel with the flow of liquid through the casing, whereby to present a relatively large heating surface.

In testimony whereof I affix my signature in presence of two witnesses.

FRED POOLE.

Witnesses:
 FRED V. KREAMER,
 A. C. ELY.